United States Patent
Kathe et al.

(10) Patent No.: US 11,860,144 B2
(45) Date of Patent: Jan. 2, 2024

(54) MEASURING CELL FOR CHEMICAL ANALYSES

(71) Applicant: Endress+Hauser Conducta GmbH+Co. KG, Gerlingen (DE)

(72) Inventors: Ulrich Kathe, Ludwigsburg (DE); Daniel Schweitzer, Remshalden (DE); Michael Ingelmann, Vaihingen/Enz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 136 days.

(21) Appl. No.: 17/464,257

(22) Filed: Sep. 1, 2021

(65) Prior Publication Data

US 2022/0065831 A1    Mar. 3, 2022

(30) Foreign Application Priority Data

Sep. 1, 2020   (DE) ............... 10 2020 122 826.0

(51) Int. Cl.
| | |
|---|---|
| *G01N 31/16* | (2006.01) |
| *G01K 13/00* | (2021.01) |
| *G01N 1/44* | (2006.01) |
| *H05B 3/56* | (2006.01) |

(52) U.S. Cl.
CPC ............ *G01N 31/16* (2013.01); *G01K 13/00* (2013.01); *G01N 1/44* (2013.01); *H05B 3/56* (2013.01)

(58) Field of Classification Search
CPC ............ G01N 31/16; G01N 1/44; G01N 1/38; G01N 1/42; G01N 1/28; G01K 13/00; H05B 3/56; H05B 1/0247
See application file for complete search history.

(56) References Cited

U.S. PATENT DOCUMENTS

| | | | |
|---|---|---|---|
| 2,952,001 A | * | 9/1960 | Morey .................... H05B 3/40 219/549 |
| 3,484,585 A | | 12/1969 | Morey |
| 5,186,895 A | | 2/1993 | Onofusa et al. |

(Continued)

FOREIGN PATENT DOCUMENTS

| | | |
|---|---|---|
| CN | 109932477 A | 6/2019 |
| CN | 110160962 A | 8/2019 |

(Continued)

*Primary Examiner* — Francis C Gray
(74) *Attorney, Agent, or Firm* — Kelly J. Smith; Endress+Hauser (USA) Holding, Inc.

(57) ABSTRACT

The present disclosure relates to a measuring cell for carrying out chemical analyses, having a vessel, in which at least one liquid to be analyzed is located; a heating wire, which is guided at least partially around an outer wall of the vessel, so that the liquid inside the vessel can be heated in a uniform and controlled manner; and a first temperature sensor, which determines and/or monitors a first temperature of the liquid. The measuring cell furthermore comprises a magnetic stirrer with a stir bar and a cover for closing the vessel, wherein the cover has a plurality of ducts, wherein at least one first duct is provided for at least one first analysis sensor, which determines and/or monitors at least one chemical and/or physical variable of the liquid of the vessel and wherein at least one second duct is provided for a liquid line.

13 Claims, 1 Drawing Sheet

(56) References Cited

U.S. PATENT DOCUMENTS

| | | | | |
|---|---|---|---|---|
| 6,436,349 B1 * | 8/2002 | Carey | ............... | G01N 35/021 |
| | | | | 422/549 |
| 2010/0314379 A1 | 12/2010 | Lin | | |
| 2017/0113225 A1 * | 4/2017 | Howell | ............... | G01N 21/272 |
| 2020/0351990 A1 * | 11/2020 | Jerjian | ............... | H05B 3/04 |
| 2021/0053047 A1 * | 2/2021 | Rottensteiner | ..... | G01N 21/0332 |

FOREIGN PATENT DOCUMENTS

| | | | | |
|---|---|---|---|---|
| CN | 112394031 A * | 2/2021 | ............ | B01L 3/502 |
| DE | 102013108556 A1 | 2/2015 | | |
| DE | 102014115445 A1 * | 4/2016 | .......... | F01N 3/2066 |
| DE | 102016103289 A1 | 8/2017 | | |
| JP | 2007090203 A * | 4/2007 | | |

\* cited by examiner

MEASURING CELL FOR CHEMICAL ANALYSES

CROSS-REFERENCE TO RELATED APPLICATION

The present application is related to and claims the priority benefit of German Patent Application No. 10 2020 122 826.0, filed on Sep. 1, 2020, the entire contents of which are incorporated herein by reference.

TECHNICAL FIELD

The present disclosure relates to a measuring cell for carrying out chemical analyses.

BACKGROUND

A typical example of a chemical analysis is the method of titration. In a titration, a sample of unknown concentration, also referred to as an analyte, in a sample solution is determined in a chemical reaction by means of a titrant solution containing a titrant having a defined concentration. In doing so, the titrant solution is precisely added to the sample solution until an equivalence point or end point is reached, at which the quantities of the titrant and of the sample are equivalent. The quantity and the concentration of the sample can then be calculated stoichiometrically from the known sample volume and from the volume, required to reach the equivalence point, of the titrant solution having a defined concentration of the titrant.

Classical examples of titration include the so-called acid-base titration, in which the concentration of an acid or a base is determined, or the so-called redox titration, in which the sample is oxidized or reduced by the titrant.

In order to determine the equivalence point of titration, an analysis sensor that determines and/or monitors at least one chemical and/or physical variable of the sample solution is generally used. The equivalence point is ascertained on the basis of a change in the chemical and/or physical variable of the sample solution. Typical examples of analysis sensors include pH electrodes, conductivity sensors, redox electrodes and photometers.

The sample solution is frequently already present as a solution, which is generally aqueous and which can be titrated with the titrant solution without further chemical treatment of the sample solution. However, prior to titration, a pre-reaction and/or a digestion of the sample are to be carried out in some cases, in order to transition the sample into a state, which enables titration. For example, a pre-reaction and/or a digestion transitions the sample into a liquid state or changes the chemical structure of the sample in such a way that it can be analyzed in a simple manner using common titration methods.

When the chemical analysis is carried out manually, the individual analysis steps, such as pre-reaction, digestion and/or titration, are typically carried out successively in different vessels, each of which is designed for the respective analysis step. Especially, the various analysis steps frequently require different temperatures.

However, when a chemical analysis is carried out in an automated manner, a single measuring cell, in which various analysis steps can be carried out successively, is generally used. For example, first a digestion of the sample and subsequently a titration of the digested sample are carried out in the same measuring cell. For this purpose, the liquid that is to be analyzed and contains the sample is placed in a vessel, which is generally heated indirectly by a heated oil or water bath in which the vessel is partially immersed. Since the oil bath is usually mixed by means of a stirring device, a stirring rod assembly is frequently used for mixing a liquid contained in the vessel and containing the sample to be analyzed. The stirring rod assembly is immersed directly into the liquid. However, such a measuring cell with stirring rod assembly and oil bath is relatively large and can frequently only be manufactured at high costs. In addition, the high mass of the measuring cell makes it difficult to rapidly heat and cool the measuring cell during and between the analysis steps or between successive analyses of different samples. The throughput of chemical analyses is reduced by the long waiting times for heating and cooling the measuring cell.

SUMMARY

The object of the present disclosure is therefore to provide a measuring cell for chemical analyses, with which a high throughput of chemical analyses can be achieved.

According to the present disclosure, the object is achieved by a measuring cell for carrying out chemical analyses, having a vessel, in which at least one liquid to be analyzed is located, a heating wire, which is guided at least partially around an outer wall of the vessel, so that the liquid inside the vessel can be heated in a uniform and controlled manner, a first temperature sensor, which determines and/or monitors a first temperature of the liquid, a cover for closing the vessel, wherein the cover has a plurality of ducts, wherein at least one first duct is provided for at least one first analysis sensor, which determines and/or monitors at least one chemical and/or physical variable of the liquid of the vessel, wherein at least one second duct is provided for a liquid line, and a magnetic stirrer with a stir bar, wherein the magnetic stirrer is arranged below the vessel and the stir bar is arranged inside the vessel.

The use of a heating wire, also known as a resistance wire, enables rapid heating of the liquid in the vessel. The liquid to be analyzed contains a sample to be analyzed. The flexible heating wire can be adapted to any desired vessel; especially, small vessels can be used, so that the measuring cell can be miniaturized. Standardized beakers can, for example, be used as a vessel. The heating wire is guided around the vessel in such a way that at least one region between a bottom of the vessel and an upper edge of the liquid is covered by the heating wire. In order to homogenize the liquid, a magnetic stirrer requiring only a small stir bar in the vessel is used, so that the use of small vessels becomes accessible. This magnetic stirrer can, for example, be a mechanical or an electromagnetic magnetic stirrer. Consequently, a small measuring cell is obtained, which has a lower mass than previously customary measuring cells. This offers the great advantage that the measuring cell according to the present disclosure can be heated much faster and also cools faster than conventional measuring cells. As a result, a higher throughput of chemical analyses is achieved, since less time is lost for heating and cooling the measuring cell. In addition, the measuring cell according to the present disclosure can be produced simply and cost-effectively.

The cover of the vessel serves to close the vessel in an essentially gas-tight manner. The elements, such as the first analysis sensor and liquid line, introduced into the ducts are also introduced into the duct in such a way that only little or no vapor of the heated liquid escapes from the vessel.

A region of the vessel that is not heated and is accordingly cooler than the heated region can connect above a heatable region of the vessel that is surrounded by the heating wire. Vapors of the heated liquid can condense by convection and be returned to the liquid. Possible errors due to liquid losses can thus be avoided or hazard sources due to corrosive or toxic vapors can thus be minimized.

The heating wire is preferably surrounded by an insulating jacket. This serves to electrically insulate the heating wire.

Advantageously, the resistance of the heating wire increases with increasing temperature. Due to a negative temperature coefficient of the specific resistance of the heating wire, the specific heat output is less at hotter locations of the heating wire than at colder ones, uniform heat input into the vessel is secured and local overheating is avoided in the area of the heating wire.

In one embodiment, the heating wire is fixed in position by means of an elastic molded jacket. The elastic molded jacket adapts to the way in which the heating wire is attached to the vessel and prevents a change in the position of the heating wire relative to the vessel.

The molded jacket of the heating wire is preferably a shrink tube. A shrink tube is a plastic tube that contracts at elevated temperature. The cold shrink tube is placed around the heating wire and shrinks under the action of heat, so that the shrink tube fixes the position of the heating wire.

In a further embodiment, a thermal fuse is attached in the molded jacket of the heating wire. This serves to switch off the heating wire when a maximum permissible temperature in the area of the thermal fuse is exceeded.

In an alternative embodiment, a second temperature sensor for determining and/or monitoring a second temperature in the area of the heating wire is provided in the molded jacket of the heating wire, so that it is possible to establish if a maximum permissible value of the second temperature is exceeded. In the event that a maximum permissible value of the second temperature is exceeded, the user can switch off the heating wire, at least temporarily.

The heating wire is advantageously guided around the outer wall of the vessel as a compact package. For example, the heating wire is guided around the vessel in a tight and tightly packed manner by wrapping the heating wire into tight windings around the vessel, in order to achieve uniform heat input into the vessel. Irregular packing of the heating wire promotes an inhomogeneous temperature profile in the vessel.

The first temperature sensor preferably regulates the heating of the vessel by the heating wire. On the basis of the first temperature of the liquid in the vessel determined by the first temperature sensor, current flows more or less strongly through the heating wire, in order to achieve the desired target temperature in the liquid.

In one possible embodiment, the vessel and the heating wire are at least partially surrounded by a housing, which serves to thermally insulate the vessel and the heating wire. The housing additionally serves as contact protection for the user of the measuring cell at high temperatures of the heating wire.

In a preferred embodiment, the cover and/or the magnetic stirrer can be connected to the housing. For example, the cover can be connected to the housing by means of screws.

In a further embodiment, a blower is provided in the vicinity of the vessel and directs an air flow toward the vessel for cooling the vessel, and wherein the blower especially cools the region between the cover and an upper edge of the liquid of the vessel. On the one hand, the blower supports rapid cooling of the vessel after completion of an analysis step that required heating of the vessel. On the other hand, the blower promotes the condensation of evaporated liquid between the cover and an upper edge of the liquid of the vessel, thereby reducing vapor leakage from the vessel. Possible errors due to liquid losses can thus be avoided or hazard sources due to possibly corrosive or toxic vapors can thus be minimized.

In one embodiment, the first temperature sensor is integrated into the first analysis sensor or a third duct for the first temperature sensor is provided in the cover. The first temperature sensor and first analysis sensor can thus be designed as a combined multi-sensor or as two separate sensors, which are then introduced into the vessel via two ducts.

A further embodiment provides that at least one fourth duct for venting the vessel is provided in the cover. Particularly at a high first temperature of the liquid, an increased level of vapor occurs in the vessel and exerts pressure on the cover. Venting the vessel prevents vapor from accumulating in the vessel.

Advantageously, a tube is attached to the at least one fourth duct for venting the vessel. The tube serves to guide vapor from the vessel to a desired location, such as an exhauster.

BRIEF DESCRIPTION OF THE DRAWINGS

The measuring cell according to the present disclosure is explained in more detail below with reference to FIGS. 1-2. The following are shown.

DETAILED DESCRIPTION

Figure 1:
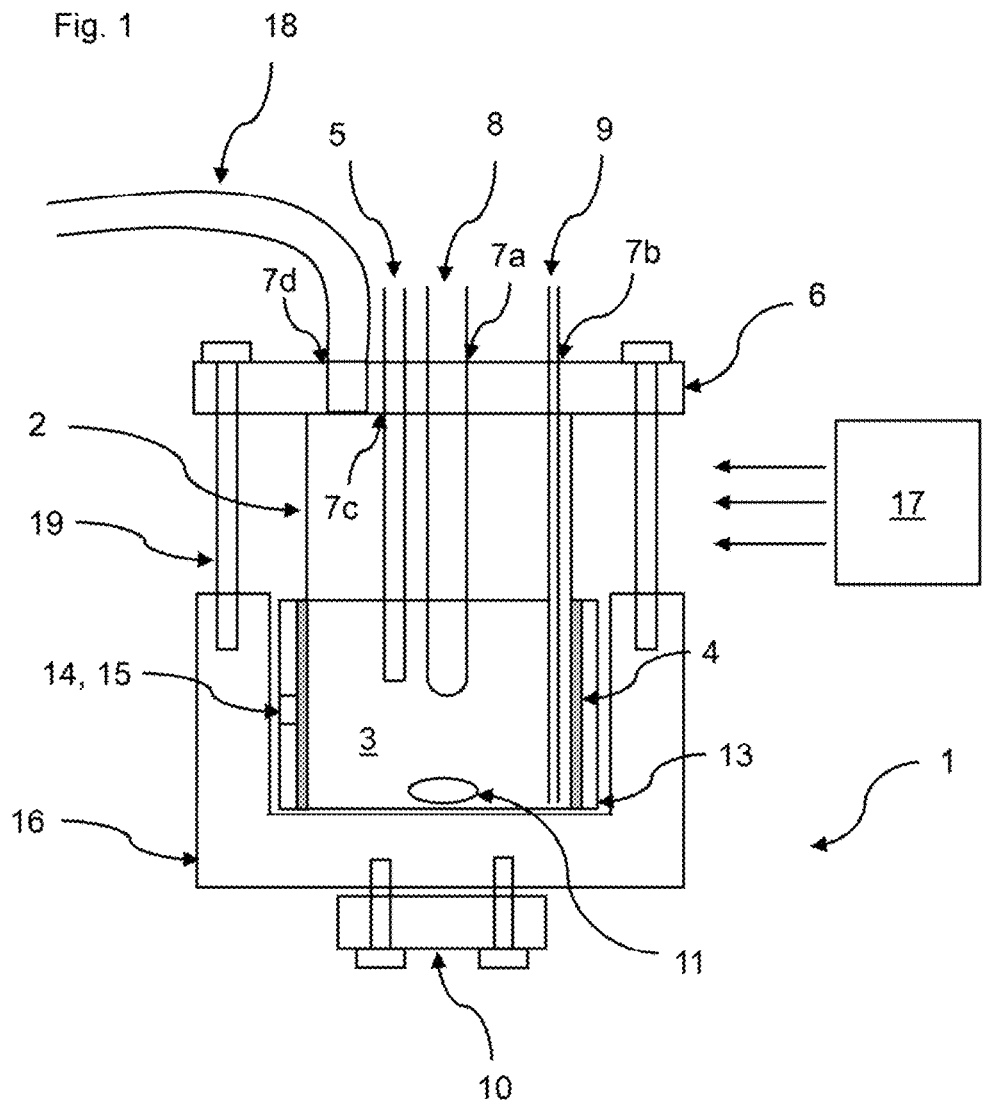
FIG. 1 shows a schematic representation of a measuring cell according to the present disclosure.

The measuring cell 1 according to the present disclosure can be used for carrying out various chemical analyses, such as titration, digestion and/or pre-reaction before titration. In FIG. 1, the liquid 3 to be analyzed is placed in the vessel 2 and provided with a stir bar 11, which mixes the liquid by means of the magnetic stirrer 10 arranged below the vessel 2. There is no limitation with regard to the shape and size of the vessel 2; especially, small, standardized vessels can be used. The heating wire 4, which heats the liquid inside the vessel in a uniform and controlled manner, is at least partially guided around an outer wall of the vessel 2. By way of example, the heating wire is guided around the vessel between the bottom of the vessel and the upper edge of the liquid. The optional elastic molded jacket 13, which fixes the heating wire 4 in its position, is additionally shown. The heating wire 4 is shown in detail in FIG. 2. A thermal fuse 14 or a second temperature sensor 15 can additionally be arranged in the molded jacket; this determines and/or monitors a second temperature in the area of the heating wire 4 and by means of which it can be established if a maximum permissible value of the second temperature is exceeded.

The vessel 2 is closed by means of a cover 6, which closes the vessel 2 in an essentially gas-tight manner, so that no or only little liquid 3 in the form of vapor escapes from the vessel 2 during heating. A series of ducts 7*a,b,c,d* are introduced into the cover 6 and serve to accommodate further elements. A first analysis sensor 8, which determines and/or monitors at least one chemical and/or physical variable of the liquid 3 of the vessel 2, is accommodated in a first duct 7*a*. For example, the first analysis sensor 8 can be a pH, conductivity, redox electrode or a photometric transceiver system. A second duct 7*b* is provided for a liquid line 9. By means of the liquid line 9, liquid is added to the vessel 2, for example titrated, or removed from the vessel 2. A plurality of liquid lines for various liquids may also be used.

A first temperature sensor 5, which determines and/or monitors a first temperature of the liquid 3, is accommodated by way of example in a third duct 7c of the cover 6. Alternatively, the first temperature sensor can be integrated into the first analysis sensor 8, such as a redox electrode, which additionally determines and/or monitors the first temperature of the liquid 3. For example, the first temperature sensor 5 regulates the heating of the vessel 2 by the heating wire 4. Optionally, a fourth duct 7d is provided in the cover 6, which duct serves to vent the vessel 2 and to which duct a tube 18 is attached, for example.

For the thermal insulation of the vessel 2 and of the heating wire 4, a housing 16 can optionally at least partially surround the vessel 2 and the heating wire 4. The housing 16 can, for example, be connectable to the cover 6 and/or the magnetic stirrer 10, as indicated in FIG. 1 by the screws 19, so that a compact, stable measuring cell 1 is produced. With that said, other possibilities for connecting the housing 16 and the vessel 2 and/or the cover 6 are not ruled out. In order to rapidly cool the measuring cell 1 again after a heating process and prepare it for the next chemical analysis, a blower 17 is optionally arranged in the vicinity of the vessel 2. The blower 17 cools the vessel 2 by directing an air flow, which is indicated by arrows, toward the vessel 2. The blower 17 can also be used, for example, during a heating process, in order to cool the region between the cover 6 and an upper edge of the liquid 3 of the vessel 2 and thus promote condensation and recirculation of the evaporated liquid 3.

Figure 2:
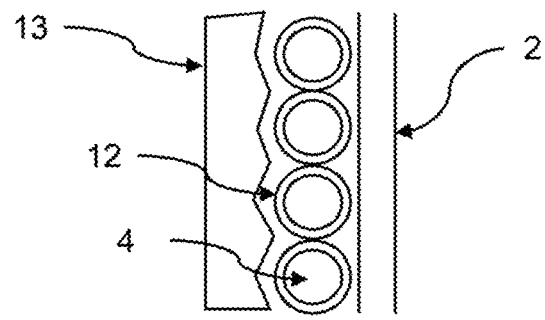
FIG. 2 shows a schematic representation of the heating wire in detail.

FIG. 2 shows the heating wire schematically in detail. By way of example, the heating wire 4 is wound around the outer wall of the vessel 2 as a compact package. By way of example, the heating wire 4 is surrounded by an insulating jacket 12 and a molded jacket 13. The molded jacket 13 can be, for example, a shrink tube. In order to avoid local temperature peaks at the heating wire 4, the heating wire 4 can be designed such that the resistance of the heating wire 4 increases with increasing temperature.

The invention claimed is:

1. A measuring cell for carrying out chemical analyses, having:
   a vessel, in which at least one liquid to be analyzed is located,
   a heating wire, which is guided at least partially around an outer wall of the vessel, so that the liquid inside the vessel can be heated in a uniform and controlled manner,
   a first temperature sensor, which determines and/or monitors a first temperature of the liquid,
   a cover for closing the vessel, wherein the cover has a plurality of ducts, wherein at least one first duct is provided for at least one first analysis sensor, which determines and/or monitors at least one chemical and/or physical variable of the liquid of the vessel, wherein at least one second duct is provided for a liquid line, and
   a magnetic stirrer with a stir bar, wherein the magnetic stirrer is arranged below the vessel and the stir bar is arranged inside the vessel;
   wherein the heating wire is fixed in position using an elastic molded jacket;
   wherein a second temperature sensor for determining and/or monitoring a second temperature in the area of the heating wire is provided in the molded jacket of the heating wire, so that it is possible to establish if a maximum permissible value of the second temperature is exceeded.

2. The measuring cell of claim 1,
   wherein the heating wire is surrounded by an insulating jacket.

3. The measuring cell of claim 1,
   wherein the resistance of the heating wire increases with increasing temperature.

4. The measuring cell of claim 1,
   wherein the molded jacket of the heating wire is a shrink tube.

5. A measuring cell for carrying out chemical analyses, having:
   a vessel, in which at least one liquid to be analyzed is located,
   a heating wire, which is guided at least partially around an outer wall of the vessel, so that the liquid inside the vessel can be heated in a uniform and controlled manner,
   a first temperature sensor, which determines and/or monitors a first temperature of the liquid,
   a cover for closing the vessel, wherein the cover has a plurality of ducts, wherein at least one first duct is provided for at least one first analysis sensor, which determines and/or monitors at least one chemical and/or physical variable of the liquid of the vessel, wherein at least one second duct is provided for a liquid line,
   a magnetic stirrer with a stir bar, wherein the magnetic stirrer is arranged below the vessel and the stir bar is arranged inside the vessel;
   wherein the heating wire is fixed in position using an elastic molded jacket;
   wherein a thermal fuse is attached in the molded jacket of the heating wire.

6. The measuring cell of claim 1,
   wherein the heating wire is guided around the outer wall of the vessel as a compact package.

7. The measuring cell of claim 1,
   wherein the first temperature sensor regulates the heating of the vessel by the heating wire.

8. The measuring cell of claim 1,
   wherein the vessel and the heating wire are at least partially surrounded by a housing, which serves to thermally insulate the vessel and the heating wire.

9. The measuring cell of claim 8,
   wherein the cover and/or the magnetic stirrer can be connected to the housing.

10. The measuring cell of claim 1,
    wherein a blower is provided in the vicinity of the vessel and directs an air flow toward the vessel for cooling the vessel, and wherein the blower especially cools the region between the cover and an upper edge of the liquid of the vessel.

11. The measuring cell of claim 1,
    wherein the first temperature sensor is integrated into the first analysis sensor, or wherein a third duct for the first temperature sensor is provided in the cover.

12. The measuring cell of claim 11,
    wherein at least one fourth duct for venting the vessel is provided in the cover.

13. The measuring cell of claim 1,
    wherein a tube is attached to the at least one fourth duct for venting the vessel.

* * * * *